United States Patent [19]

Aikoh et al.

[11] Patent Number: 5,126,563

[45] Date of Patent: Jun. 30, 1992

[54] OPTICAL READING-WRITING APPARATUS HAVING A MOVING UNIT

[75] Inventors: Hideki Aikoh, Higashiosaka City; Masayuki Shinoda, Moriguchi City; Tohru Nakamura, Katano City, all of Japan

[73] Assignee: Matsushita Electric Co., Ltd., Kadoma, Japan

[21] Appl. No.: 620,719

[22] Filed: Dec. 3, 1990

[30] Foreign Application Priority Data

Dec. 13, 1989 [JP] Japan .................................. 1-324792

[51] Int. Cl.⁵ .............................................. H01J 3/14
[52] U.S. Cl. .................................. 250/234; 369/44.23
[58] Field of Search ................. 350/6.2, 6.3; 358/497; 369/44.13, 44.23, 44.29, 44.32

[56] References Cited

U.S. PATENT DOCUMENTS

| | | | |
|---|---|---|---|
| 4,293,944 | 10/1981 | Izumita | 369/44.23 |
| 4,296,316 | 10/1981 | Tsuji | 369/44.23 |
| 4,607,157 | 8/1986 | Millar | 369/44.13 |
| 4,764,815 | 8/1988 | Landsman | 358/497 |
| 4,779,255 | 10/1988 | Sugiyama et al. | 369/44.23 |
| 4,850,673 | 7/1989 | Velzel et al. | 369/44.23 |
| 4,918,679 | 4/1990 | Opheij et al. | 369/44.23 |
| 5,012,354 | 4/1991 | Tsuchiya | 358/497 |

*Primary Examiner*—Edward P. Westin
*Assistant Examiner*—S. Allen

[57] ABSTRACT

In an optical reading-writing apparatus, moving unit (14) has only a mirror (21) for reflecting a horizontal laser beam in vertical direction, an objective lens (22) for converting the laser beam on a recording face of an optical disc (11) and an objective lens driving device (23), and the moving unit (14) is slidably driven in radial direction by a moving unit driving device (24) and the other optical elements such as a semiconductor laser (15), a collimator lens (16), a mirror (17), a beam splitter (18), a photo-sensor (19) and a signal detecting device (20) are fixed on a base member (13).

11 Claims, 7 Drawing Sheets

FIG.5 (a)
FIG.5 (b)
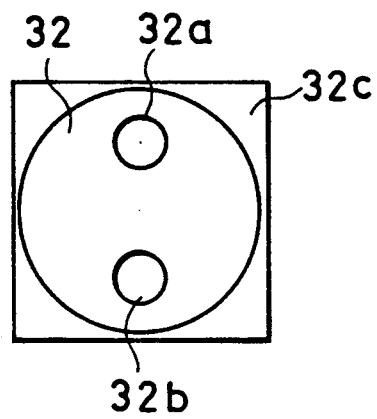
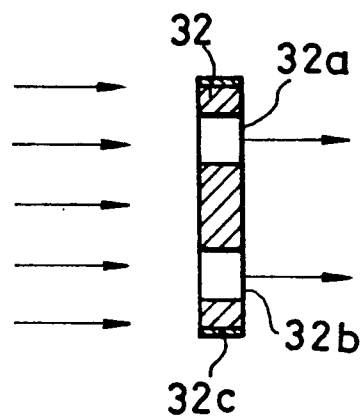
FIG.6
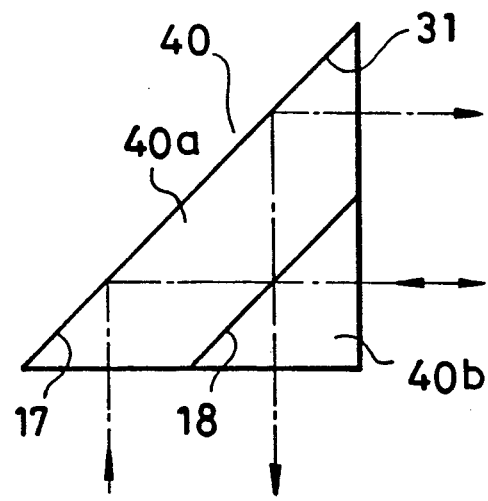

OPTICAL READING-WRITING APPARATUS HAVING A MOVING UNIT

BACKGROUND OF THE INVENTION

1. Field of the Invention

The present invention relates to an optical reading-writing apparatus wherein laser beam is irradiated on a data recording medium such as a magneto-optical disc for writing, reading and erasing the data.

2. Description of Prior Art

In recent years, a magneto-optical disc is used as a high density and mass storage memory. The magneto-optical disc is used as a data recording medium in an optical reading-writing apparatus. The magneto-optical disc apparatus is required to be compact and simple and to have a performance of high-speed access.

A conventional optical disc reading apparatus used only for reading the data in a conventional optical reading-writing apparatus is described referring to FIG. 8.

In FIG. 8, an optical disc 1 as a data recording medium is rotated by a spindle motor 2. A semiconductor laser 3 is used as a light source for reading signals written on the optical disc 1. On an optical base 4, which is provided for slidably moving in radial direction of the optical disc 1, a semitransparent mirror (beam splitter) 5 for splitting the light beam from the semiconductor laser 3 in two ways and mirrors 6 and 7 are provided. The light reflected by mirror series of semitransparent mirror 5 and mirrors 6 and 7 is converged on a predetermined position on the optical disc 1 by an objective lens 8. The light beam reflected by the surface of the optical disc 1 is further converged by objective lens 8, reflected by the mirrors 7 and 6. And the light passes through the semitransparent mirror 5 and reaches to a photo-sensor 9.

A feed screw 10a and a guiding rod 10b are provided in radial direction of the optical disc 1. And the optical base 4 is driven in the radial direction shown by arrows K by rotation of the feed screw 10a.

In the above-mentioned conventional optical disc reading apparatus, a high-speed access can not be achieved since the optical base 4 is driven by the feed screw 10b. For acceding in a high-speed, a linear motor constituted by a driving coil and a magnetic circuit is proposed for replacing the feed screw 10 for driving the optical base 4. In such use of the linear motor, the optical base 4 can be driven in a high speed in radial direction of the optical disc 1 by the driving coil and magnetic circuit in principle. The optical base 4, which comprises optical elements such as the semiconductor laser 3, the photo-sensor 9 and so on, however, has a large mass, thereby hindering sufficient improvement of the access speed.

Furthermore, when a magneto-optical disc is used as a data recording medium, a magnetic head for overwriting is necessary to be fixed on an U-letter shaped optical base for configurating a magneto-optical overwriting moving unit of a magnetic modulation type. In this case, mass of the optical base is further increased and the access speed becomes slower.

SUMMARY OF THE INVENTION

Purpose of the present invention is to solve the above-mentioned problems of the conventional optical reading-writing apparatus and to provide an improved optical reading-writing apparatus capable of performing a high-speed access by decreasing mass and size of a moving unit.

An optical reading-writing apparatus in accordance with the present invention comprises:
a base member;
a motor provided on the base member;
a data recording medium to be rotated by the motor;
a moving unit slidably held on the base member for moving in radial direction of the data recording medium; and
fixed optical system fixed on the base member;
(a) the moving unit comprising:
a first mirror for reflecting light beam to the data recording medium;
an object lens for converging the light beam reflected by the first mirror on a surface of the data recording medium; and
a driving means for driving the objective lens; and
(b) the fixed optical system comprising:
a light source for radiating light beam;
a second mirror for reflecting the light beam from the light source to a direction parallel moving direction of the moving unit and irradiating the light beam to the first mirror;
a beam splitter provided between the first and the second mirrors for distributing the light beam reflected by the second mirror and for reflecting the light beam reflected by the first mirror; and
signal detecting means for detecting data signals from the data recording medium, focusing error signals and tracking error signals based on the reflected light beam from the data recording medium which is split by the beam splitter.

In the above-mentioned optical reading-writing apparatus in accordance with the present invention, the first mirror, the objective lens and the objective lens driving device only are provided on the moving unit and the moving unit is slidably held in radial direction of the data recording medium. And on the other hand, the light source such as a semiconductor laser, the second mirror and the beam splitter are provided on the fixed optical system on the base member. And, the laser beam radiated from the light source is given to the beam splitter via the second mirror. The data recording medium such as a magneto-optical disc is directly rotated by the motor. Laser beam passing through the beam splitter is irradiated to the first mirror and further irradiated to the data recording medium via the objective lens. The light beam reflected from the data recording medium reaches to the signal detecting device via the first mirror and the beam splitter. The signal detecting device detects the data signal from the data recording medium, focusing error signal and the tracking error signal.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 5(a) is a front view showing details of an aperture member used in the embodiment of the optical reading-writing apparatus shown in FIG. 4.

FIG. 5(b) is a cross-sectional side view of the aperture member shown in FIG. 5(a).

FIG. 6 is a plan view showing details of still other embodiment of combined prisms which can be used in the second embodiment of the optical reading-writing apparatus shown in FIG. 4.

DESCRIPTION OF THE PREFERRED EMBODIMENTS

Figure 1:
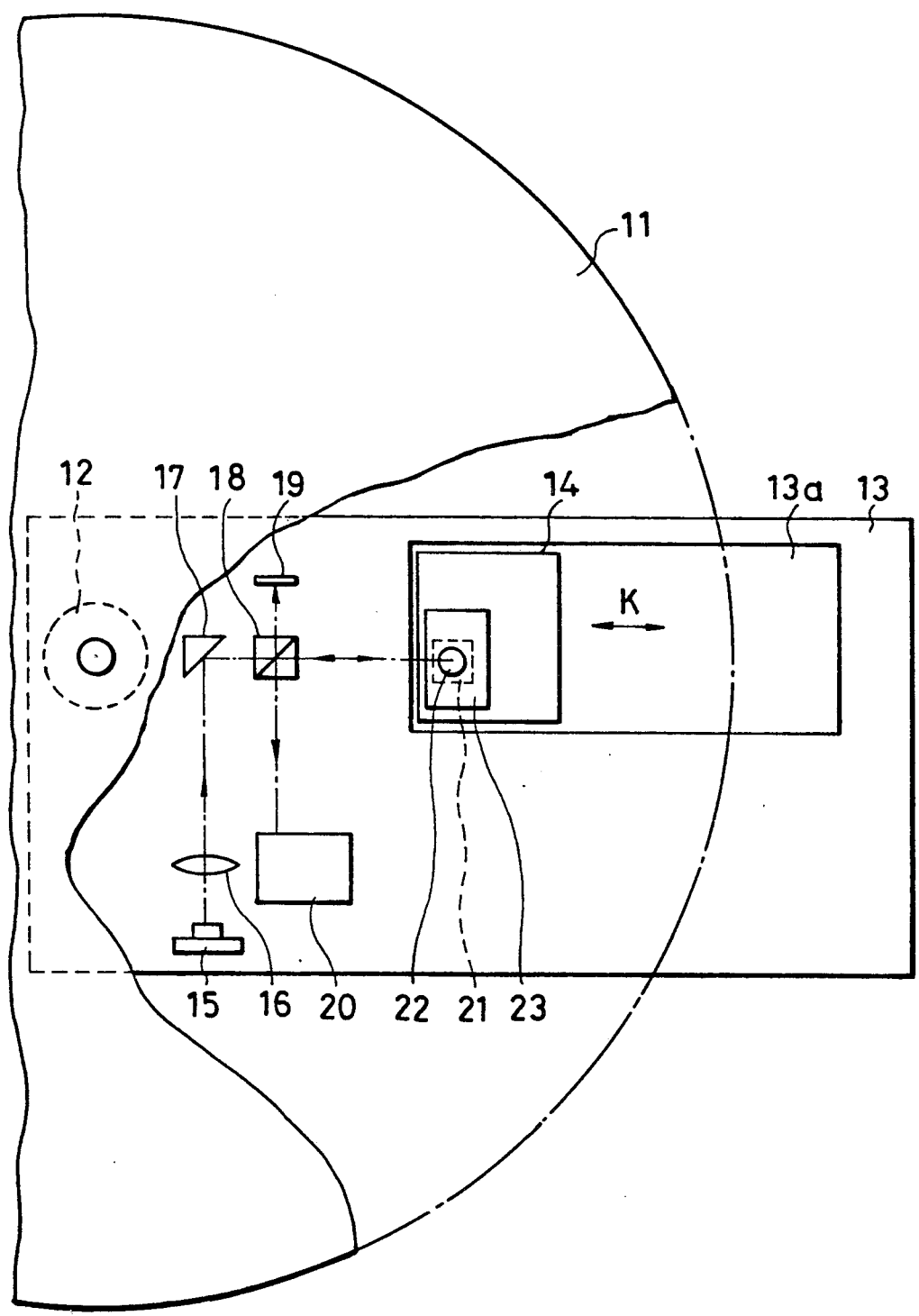
FIG. 1 is a plan view showing constitution of a first preferred embodiment of an optical reading-writing apparatus in accordance with the present invention.
Figure 2:
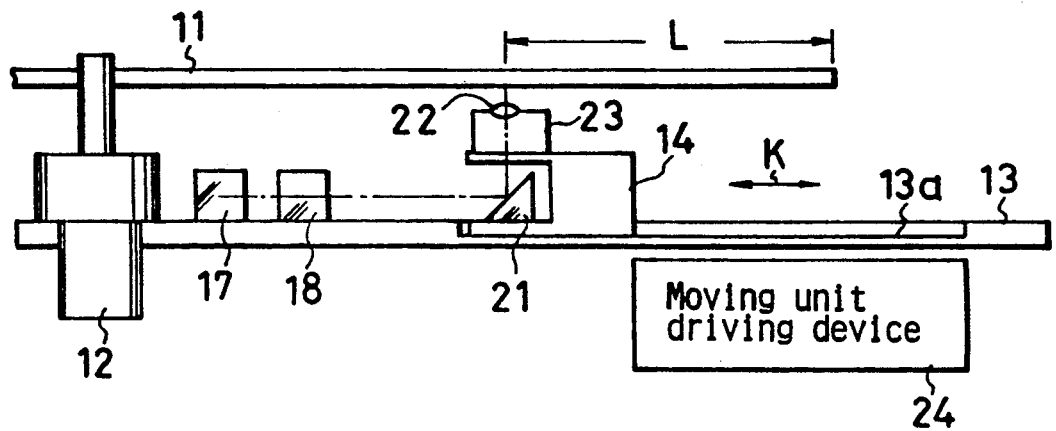
FIG. 2(a) is a sectional side view of the optical reading-writing apparatus shown in FIG. 1.
FIG. 2(b) is a sectional side view of the optical reading-writing apparatus in accordance with the present invention which is applied to magneto-optical disc.
Figure 2:
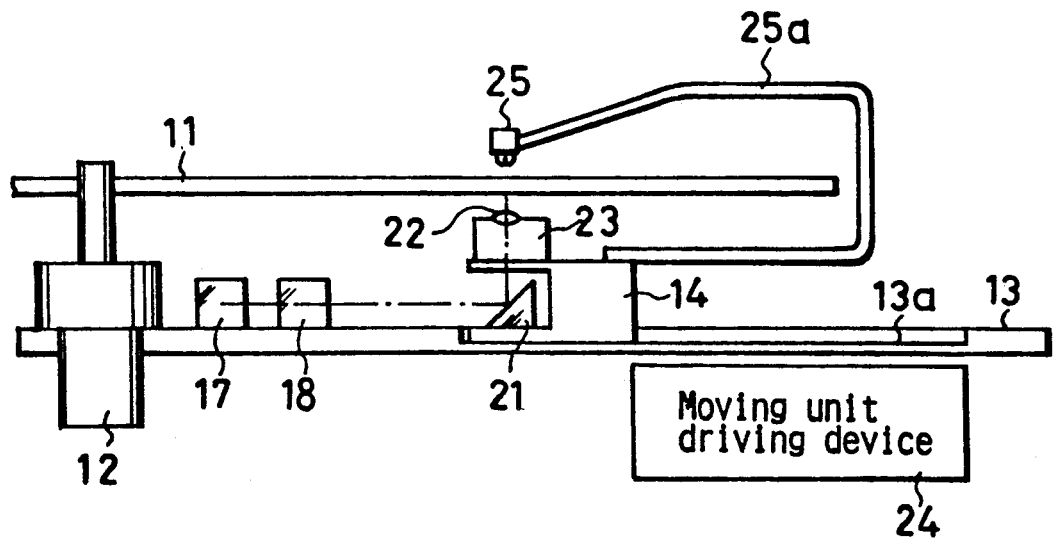

A first preferred embodiment of an optical reading-writing apparatus in accordance with the present invention is described referring to FIGS. 1 and 2(a). FIG. 1 is a plan view showing constitution of the first embodiment of the optical reading-writing apparatus. FIG. 2(a) is a cross-sectional side view of the optical reading-writing apparatus shown in FIG. 1.

In FIGS. 1 and 2(a), an interchangeable optical disc 11 as a data recording medium is rotated by a spindle motor 12. The spindle motor 12 is fixed on a base member 13 as shown in FIG. 2(a). A guide groove 13a is provided in radial direction of the optical disc 11 shown by arrow K on the base member 13. A moving unit 14 is slidably held along the guide groove 13a.

A semiconductor laser 15 is provided on the base member 13. Furthermore, a collimator lens (beam expander) 16 for converting laser rays radiated from the semiconductor laser 15 to parallel laser beam and a second mirror 17 for reflecting the laser beam to the radial direction of the optical disc 11 are provided on an optical axis of the semiconductor laser 15. A beam splitter (semitransparent mirror) 18 is provided on an optical axis of the light beam reflected by the second mirror 17 and a transmitted light beam which passes through the beam splitter 18 reaches to the moving unit 14. The beam splitter 18 splits the laser beam radiated from the semiconductor laser 15 so as to travel straight in part to the moving unit 14 and reflects in the remainder to a photo-sensor 19, and also reflects a light beam reflected from the moving unit 14 to a signal detecting device 20. The photo-sensor 19 serves as a light amount measuring device which measure the light amount of the laser beam radiated from the semiconductor laser 15 by measuring an amount of part of the laser beam reflected by the beam splitter 18. The signal detecting device 20 detects focusing error signal and tracking error signal by basing on the reflected light beam by the beam splitter 18.

On the moving unit 14, a first mirror 21 for reflecting the laser beam to upward direction, an objective lens 22 and an objective lens driving device 23 are provided as shown in FIG. 2(a). The objective lens driving device 23 drives the objective lens 22 along an optical axis of the lens 22 and minutely drives along radial direction of the lens 22 for controlling the focusing and tracking of the lens 22. Thereby, the laser beam is converged on a predetermined track on a recording face of the optical disc 11 by the objective lens driving device 23.

The semiconductor laser 15 and the collimator lens 16 constitute a light source which radiates parallel light beam. They are fixed on the base member 13 with the second mirror 17, the beam splitter 18, the photo-sensor 19 and the signal detecting device 20 for constituting a fixed optical system. A moving unit driving apparatus 24 for driving the moving unit 13 is provided below the guide groove 13a.

The above-mentioned elements except the optical disc 11 are exaggeratedly drawn in the figures. For example, the closest distance between the centers of the motor 12 and the objective lens 22 is about 20 mm and a side of the beam splitter 18 is about 5 mm.

Operation of the first embodiment of the optical reading-writing apparatus in accordance with the present invention is described.

The optical disc 11 is rotated by the spindle motor 12 which is fixed on the base member 13. The laser beam radiated from the semiconductor laser 15 is expanded to the parallel light beam by the collimator lens 16 and the laser beam reaches to the first mirror 21 of the moving unit 14 via the second mirror 17 and the beam splitter 18. The moving unit 14 is reciprocally driven in a movable region shown by L in FIG. 2(a) and along the guide groove 13a by the moving unit driving device 24.

On the moving unit 14, the objective lens 22 is driven responding to the focusing error signal and the tracking error signal by the objective lens driving device 23, and thereby the laser beam is converged on the recording face of the optical disc 11.

The laser beam is reflected by the recording face of the optical disc 11 and the reflected laser beam is further reflected by the first mirror 21 and the beam splitter 18 and reaches to the signal detecting device 20. The reflected laser beam contains the informations of the data recorded on the optical disc 11, the focusing error component and the tracking error component. The signal detecting device 20 reads the data, the focusing error signal and the tracking error signal from the reflected laser beam.

A part of the laser beam radiated from the semiconductor laser 15 is directly reflected by the beam splitter 18 and reaches to the photo-sensor 19. Driving current of the semiconductor laser 15 is controlled responding to output of the photo-sensor 19, and thereby power of the laser beam radiated by the semiconductor laser 15 is maintained in a predetermined level.

In the above-mentioned first embodiment, only the first mirror 21 and the objective lens 22 which are optical elements are carried by the moving unit 14, so that mass of the moving unit 14 is largely reduced from that of the conventional apparatus, and hence, accessing performance for reading and writing the data on the optical disc 11 is largely improved. The laser beam from the semiconductor laser 15 is reflected to the moving unit 14 by the second mirror 17, and the optical axis of the semiconductor laser 15 is square with the moving direction of the moving unit 14. Thereby, the fixed optical system is effectively located on the base member 13, and as a result, the base member 13 can be miniaturized.

The beam splitter 18 has a cube shape. Therefore, when the fixed optical system on the base member 13 is to be covered by a cover member (not shown in the figure), a part of the cover member facing to an exit plane of the beam splitter 18 can be cut.

Furthermore, the second mirror 17 and the beam splitter 18 are located between the spindle motor 12 and the moving unit 14, so that the moving unit driving device 24 is arbitrary located in the vicinity of the guide groove 13a. Accordingly, a linear motor constituted by a driving coil and a magnetic circuit can be used as a moving unit driving device 24 and the closed magnetic circuit can easily be constituted in this case.

FIG. 2(b) shows a modified embodiment. This embodiment is for writing on a magneto-optical disc by modifying the above-mentioned first embodiment of the optical reading-writing apparatus in accordance with the present invention. A magnetic head 25 of a magnetic modulation type for over writing is provided above the optical disc 11 and facing to the objective lens 22, as shown in FIG. 2(b). The magnetic head 25 is coupled to the moving unit 14 via an arm 25a. When any element is not located in the vicinity of the guide groove 13a, the arm 25a for the over-writing magnetic head 25 is easily provided.

Figure 3:
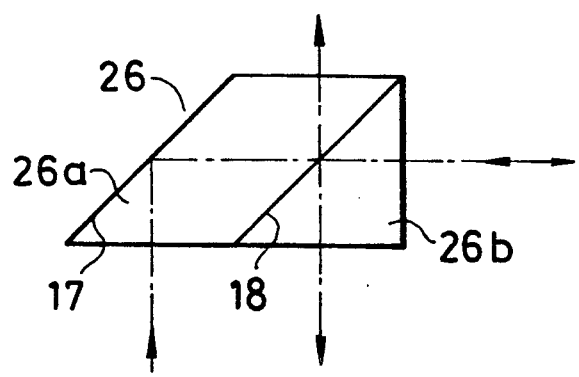
FIG. 3 is a plan view showing details of another embodiment of combined prisms which can be used in the first embodiment of the optical reading-writing apparatus shown in FIGS. 1 and 2.

FIG. 3 shows a combination of the second mirror 17 and the beam splitter 18. In FIG. 3, a parallelogram prism 26a and a rectangular prism 26b are optically bonded in one body. The beam splitter (semitransparent mirror) 18 is formed on the bonding surface of the prisms 26a and 26b. The second mirror 17 is formed on a surface of the prism 26a facing to the beam splitter 18. In the combination of the second mirror 17 and the beam splitter 18, at least one incident plane or exit plane is dispensed with. Decentering of the optical axis between the prisms 26a and 26b is not exist and thereby, the location of the second mirror 17 and the beam splitter 18 can easily be adjusted.

Figure 4:
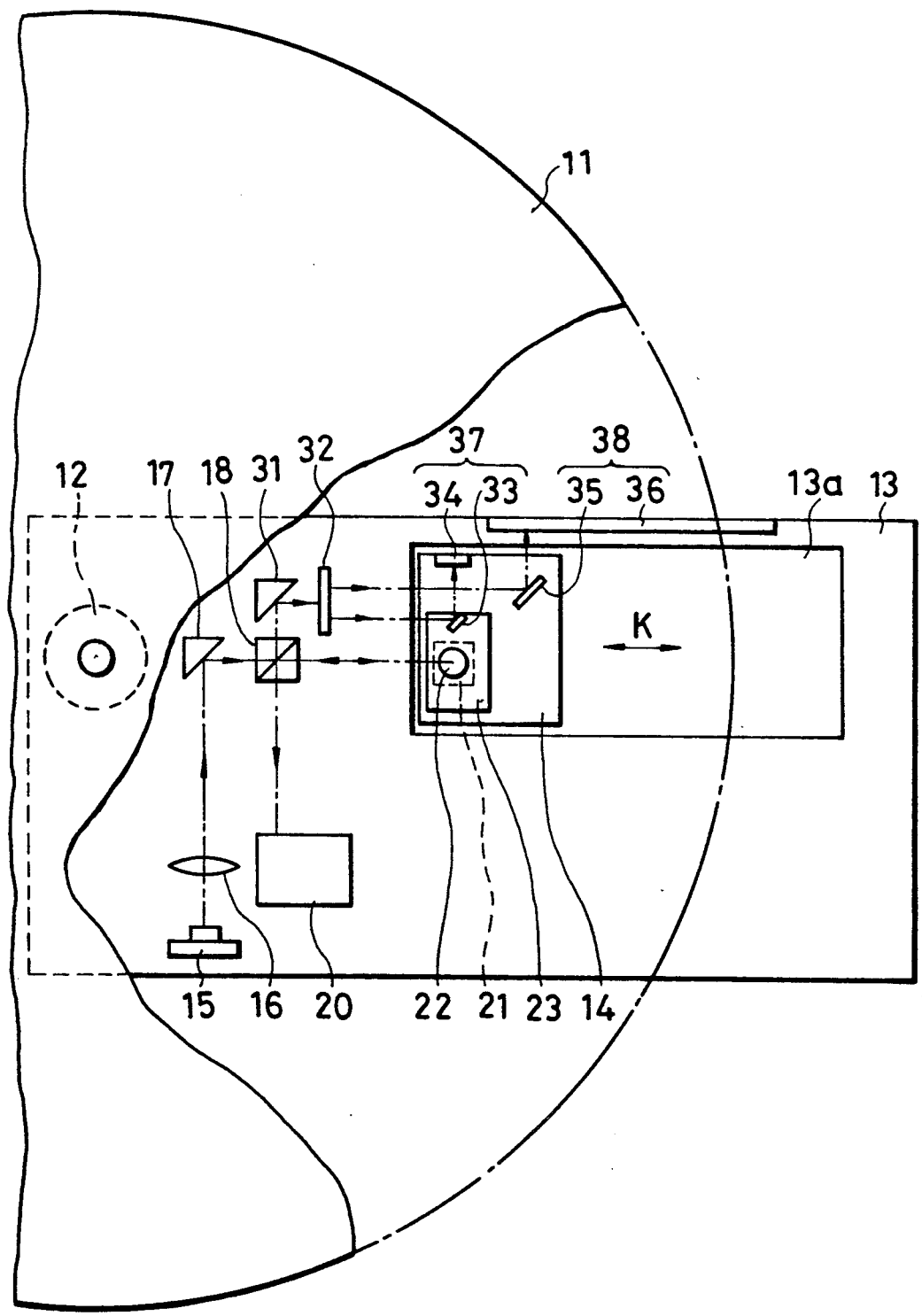
FIG. 4 is a plan view showing constitution of a second preferred embodiment of an optical reading-writing apparatus in accordance with the present invention.

A second preferred embodiment of an optical reading-writing apparatus in accordance with the present invention is described referring to FIG. 4. FIG. 4 is a plan view showing constitution of the second embodiment of the optical reading-writing apparatus. Elements designated by the same numerals shown in the first embodiment are substantially the same as those of the first embodiment.

In the second embodiment, a third mirror 31 is replaced with the photo-sensor 19 in the fixed optical system in comparison with FIG. 1. The third mirror 31 reflects the light beam reflected by the beam splitter 18 in a direction parallel to the light beam passing through the beam splitter 18. On the optical axis of the light beam reflected by the third mirror 31, an aperture member 32 for making two parallel beams is provided on the base member 13. As shown in FIGS. 5(a) and 5(b), the aperture member 32 has two circular apertures 32a and 32b. Two light beams separated by the aperture member 31 have circular-sections respectively. The aperture member 32 serves as a kind of the beam splitter.

On an optical axis of one of the two parallel beams passing through the aperture member 32, a mirror 33 serving as a first position detecting member is provided on the objective lens driving apparatus 23 as shown in FIG. 4. And a first position detector 34 for detecting a minute displacement of a reflected light by the mirror 33 in a direction shown by arrow K is provided on the moving unit 14.

Furthermore, another mirror 35 for serving as a second position detecting member and for reflecting the other light beam passing through the aperture member 32 is provided on the moving unit 14. A second position detector 36 receiving the reflected light beam by the mirror 35 is provided on the base member 13. Hereupon, light refraction member such as a prism which refracts a ray in a predetermined direction can be replaced with the mirror 33 or 35. The mirror 33 and the first position detector 34 constitute an objective lens position detecting device 37. And the mirror 35 and the second position detector 36 constitute a moving position detecting device 38 for detecting the position of the moving unit 14 or the objective lens 22 in the radial direction of the optical disc 11 shown by arrow K.

When the objective lens 22 is driven in the radial direction of the optical disc 11, the position of the objective lens 22 is detected by the first position detector 34. Accordingly, even when the objective lens driving device 23 is held by, for example, an elastic member, the objective lens 22 can be controlled by using on signals from the first position detector 34, so as to absorb vibration due to the movement of the moving unit 14 in a short time.

The light beam passing through the aperture member 32 and reflected by the mirror 34 reaches to the second position detector 36. The position of the moving unit 14 in the radial direction of a recording area of the optical disc 11 is detected by signals from the second position detector 36. Therefore, the signals from the second position detector 36 can be used for controlling the moving unit 14 in high speed accessing of the data recorded in the optical disc 11. Furthermore, the light amount received by the second position detector 36 is measured by the detector 36, so that the power of the light irradiated from the semiconductor laser 15 is controlled by a feedback system.

FIG. 6 shows a combination of the second mirror 17, the beam splitter 18 and the third mirror 31. In FIG. 6, a trapezoid prism 40a and a rectangular prism 40b are optically bonded in one body. The beam splitter 18 is formed on the bonding surface of the prisms 40a and 40b. The second and the third mirrors 17 and 31 are formed on the same surface of the prism 40a facing to the beam splitter 18. In the combination of these members of the second mirror 17, the beam splitter 18 and the third mirror 31, incident planes or exit planes at least two of them can be reduced. Thereby, decentering of the optical axes among the second mirror 17, the beam splitter 18 and the third mirror 31 are removed, and thereby the adjustment of the optical axes can easily be executed.

Besides, only two of the second mirror 17, the beam splitter 18 and the third mirror 31 can be optically bonded in one body for obtaining the similar effects.

As a position detecting device of the moving unit 14, the mirror 35 may be driven with the objective lens 22 by the objective lens driving device 23 for detecting the position of the objective lens 22 by the position detector 36 which is held on the base member 13. Furthermore, a light amount measuring device for measuring only the light amount from the semiconductor laser 15 can be provided on the moving unit 14.

Figure 7:
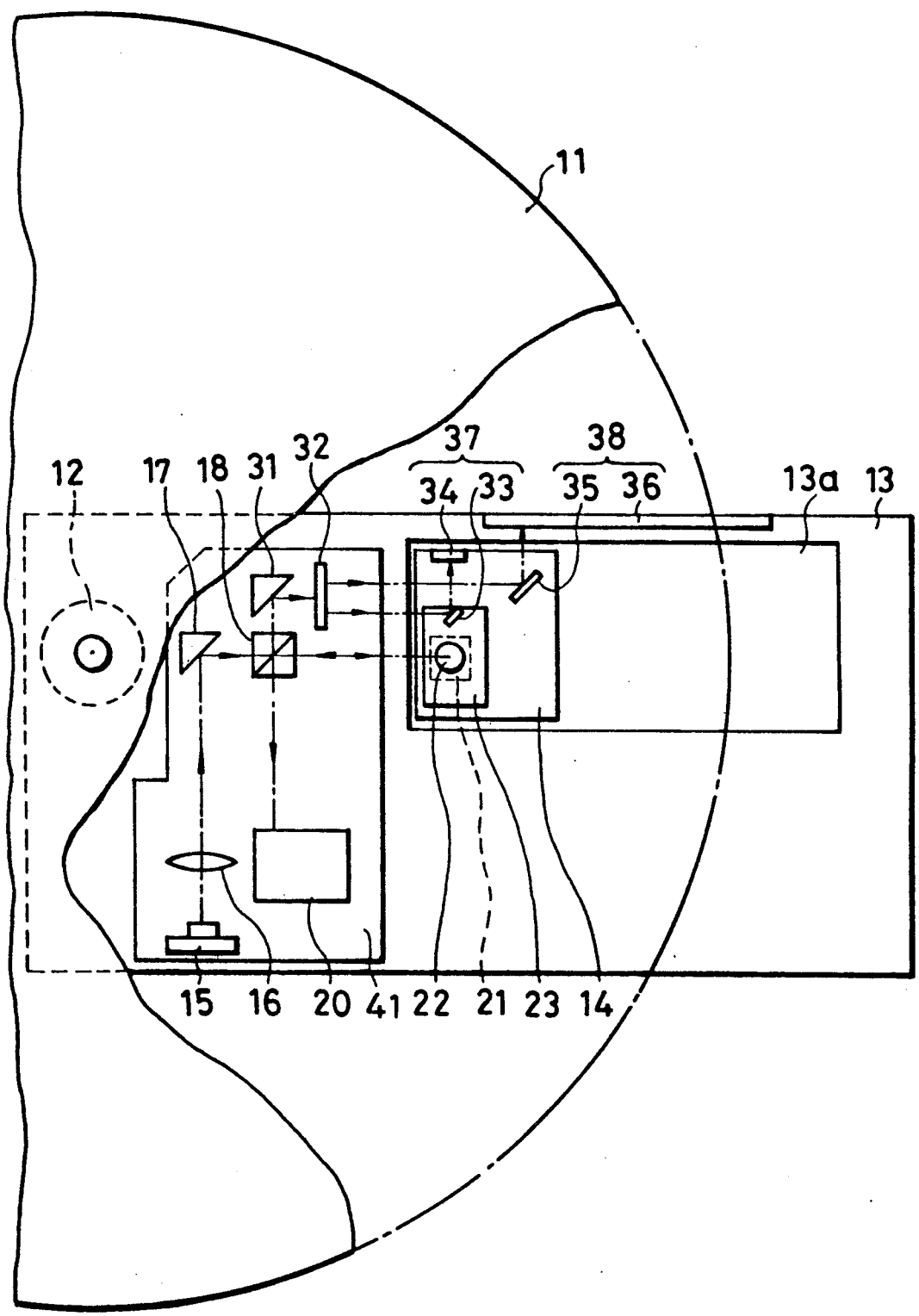
FIG. 7 is a plan view showing constitution of a third preferred embodiment of an optical reading-writing apparatus in accordance with the present invention.
Figure 8:
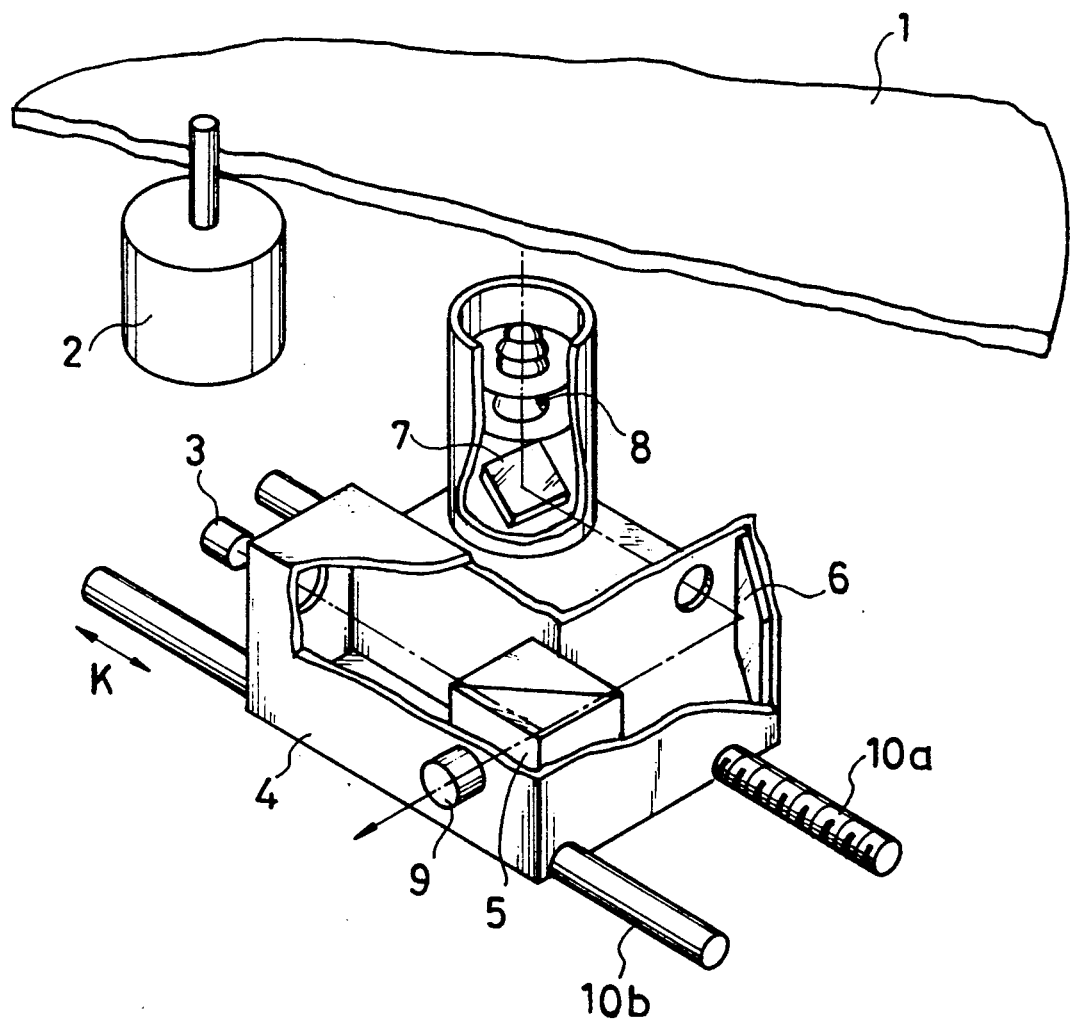
FIG. 8 is the perspective view showing the constitution of the conventional optical reading-writing apparatus.

A third preferred embodiment of an optical reading-writing apparatus in accordance with the present invention is described referring to FIG. 7. FIG. 7 is a plan view showing the third embodiment of the optical reading-writing apparatus. Elements designated by the same numerals shown in the first and the second embodiments are substantially the same as those of the first and the second embodiments.

In FIG. 7, the fixed optical system is constituted by the semiconductor laser 15, the collimator lens 16, the second mirror 17, the beam splitter 18, the signal detecting device 20, the third mirror 31 and the aperture member 32, and is fixed on an optical base (optical flat) 41. By positioning the optical base 41 precisely on the base member 13, decenterings of optical axes of those elements are reduced.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An optical reading-writing apparatus comprising:
   a base member;
   a motor provided on said base member;
   a data recording medium to be rotated by said motor;
   a moving unit slidably held on said base member for moving in radial direction of said data recording medium; and
   fixed optical system fixed on said base member;
   (a) said moving unit comprising:
   a first mirror for reflecting light beam to said data recording medium;
   an objective lens for converting said light beam reflected by said first mirror on a surface of said data recording medium; and
   a driving means for driving said objective lens; and
   (b) said fixed optical system comprising:
   a light source for radiating said light beam;
   a second mirror for reflecting said light beam from said light source to a direction parallel to the moving direction of said moving unit and irradiating said light beam to said first mirror;
   a beam splitter provided between said first and second mirrors for distributing said light beam reflected by said second mirror and for reflecting said light beam reflected by said first mirror; and
   signal detecting means for detecting data signals from said data recording medium, focusing error signals and tracking error signals based on said reflected light beam from said data recording medium which is split by said beam splitter.

2. An optical reading-writing apparatus in accordance with claim 1, wherein
   said second mirror and said beam splitter are optically incorporated with one body.

3. An optical reading-writing apparatus in accordance with claim 1, wherein
   said beam splitter reflects and passes said reflected light beam from said second mirror in a predetermined ratio, and further comprises
   light amount measuring means provided in said fixed optical system for measuring an amount of said part of light beam contained in said light beam radiated from said light source and reflected by said beam splitter.

4. An optical reading-writing apparatus in accordance with claim 1, wherein said second mirror and said beam splitter are located between said moving unit and said motor, and
a driving means for driving said moving unit in radial direction of said data recording medium is provided on an opposite position of said motor against said moving unit.

5. An optical reading-writing apparatus in accordance with claim 1, further comprises
   a third mirror reflecting said light beam reflected by said beam splitter in a direction substantially parallel to said light beam passing through said beam splitter is provided in said fixed optical system.

6. An optical reading-writing apparatus in accordance with claim 5, wherein
   at least two of said second mirror, said beam splitter and said third mirror are optically incorporated with one body.

7. An optical reading-writing apparatus in accordance with claim 5, further comprising
   light amount measuring means for measuring amount of light reflected by said third mirror and provided on said moving unit.

8. An optical reading-writing apparatus in accordance with claim 5, further comprising
   objective lens position detecting means provided on said moving unit for detecting relative position of said objective lens against said moving unit, and having
   a first direction changing member held on said means for driving said objective lens and for changing direction of said light beam reflected by said third mirror, and
   a first position detector fixed on said moving unit for detecting a position irradiated by said light beam, direction of which is changed by said first direction changing member.

9. An optical reading-writing apparatus in accordance with claim 5, further comprising
   moving position detecting means for detecting relative position of said moving unit against said base member and having
   a second direction changing member fixed an said moving unit and for changing direction of said light beam reflected by said third mirror, and
   a second position detector fixed on said base member for detecting a position irradiated by said light beam, direction of which is changed by said second direction changing member.

10. An optical reading-writing apparatus in accordance with claim 5, further comprising
    (1) objective lens position detecting means provided on said moving unit for detecting relative position of said objective lens with regard to said moving unit, and having
    a first direction changing member held on said means for driving said objective lens and for changing direction of said light beam reflected by said third mirror, and
    a first position detector fixed on said moving unit for detecting a position irradiated by said light beam, direction of which is changed by said first direction changing member;
    (2) moving position detecting means for detecting relative position of said moving unit against said base member and having
    a second direction changing member fixed on said moving unit and for changing direction of said light beam reflected by said third mirror, and a second position detector fixed on said base member for detecting a position irradiated by said light beam, direction of which is changed by said second direction changing member; and (3) beam splitting means splitting said light beam reflected by said beam splitter in two way for supplying to said objective lens position detecting means and to said moving position detecting means.

11. An optical reading-writing apparatus in accordance with claim 1, 2, 3, 4, 5, 6, 7, 8, 9 or 10, further comprising an optical flat for holding said fixed optical system and provided on said base member.

* * * * *